United States Patent [19]

Sato

[11] Patent Number: 4,476,679

[45] Date of Patent: Oct. 16, 1984

[54] CIVIL ENGINEERING AND CONSTRUCTION MACHINERY WITH HYDRAULIC DRIVE SYSTEM

[75] Inventor: Masayuki Sato, Tsuchiura, Japan

[73] Assignee: Hitachi Construction Machinery Co., Ltd., Tokyo, Japan

[21] Appl. No.: 234,177

[22] Filed: Feb. 13, 1981

[30] Foreign Application Priority Data

Feb. 15, 1980 [JP] Japan .................................. 55-16635

[51] Int. Cl.³ .............................................. F16D 31/02

[52] U.S. Cl. ........................................ 60/434; 60/471; 60/484; 60/444; 60/429

[58] Field of Search ................. 60/433, 471, 484, 434, 60/431, 429, 444, 427; 62/698

[56] References Cited

U.S. PATENT DOCUMENTS

| | | | |
|---|---|---|---|
| 2,312,996 | 3/1943 | Bethenod | 126/247 |
| 3,792,791 | 2/1974 | Fleming et al. | 214/762 |
| 4,192,456 | 3/1980 | Shields et al. | 237/12.3 R |

*Primary Examiner*—Albert J. Makay

*Assistant Examiner*—Henry Bennett

*Attorney, Agent, or Firm*—Antonelli, Terry & Wands

[57] ABSTRACT

A hydraulic drive system for civil engineering and construction machinery having at least one hydraulic pump driven by a prime mover, at least one hydraulic actuator connected to the hydraulic pump, and at least one hydraulic cylinder, the hydraulic actuator and hydraulic cylinder being adapted to operate movable members. The hydraulic drive system is provided with a hydraulic pump-motor coupled to the prime mover, a first conduit for connecting the hydraulic pump-motor to one side of the hydraulic cylinder which moves a movable member in a direction in which the potential energy thereof increases in magnitude upon feeding of liquid under pressure thereinto, a second conduit for connecting the other side of the hydraulic cylinder to a reservoir, and an arrangement for controlling the hydraulic pump-motor in such a manner that it functions as a motor when the operator operates the system to move the movable member in a direction in which the potential energy thereof is reduced in magnitude.

5 Claims, 2 Drawing Figures

CIVIL ENGINEERING AND CONSTRUCTION MACHINERY WITH HYDRAULIC DRIVE SYSTEM

BACKGROUND OF THE INVENTION

This invention relates to civil engineering and construction machinery, and more particularly, to a hydraulic drive system for civil engineering and construction machinery, such as, for example, hydraulic shovels, hydraulic cranes, etc., with the drive system comprising at least one hydraulic pump driven by a prime mover, at least one actuator connected to the hydraulic pump and at least one hydraulic cylinder, wherein the hydraulic actuator and the hydraulic cylinder are adapted to operate a plurality of movable members.

Civil engineering and construction machinery, such as hydraulic shovels, hydraulic cranes, etc., generally comprise a plurality of heavy parts, and a hydraulic drive system is usually employed for controlling these parts. For example, in a hydraulic shovel of the prior art, one hydraulic pump is used when a boom is raised at low speed and two hydraulic pumps are used when the boom is raised at higher speed, to supply pressurized liquid to the bottom side of a boom cylinder thereby controlling the speed at which the boom is raised. When the boom is lowered, a directional control valve is actuated to return the liquid from the bottom side of the boom cylinder. In this case, the lowering of the boom takes place at high speed due to the potential energy of the boom if one directional control valve is brought to a full open position. To prevent the boom from being lowered too fast, it has been customary to control the speed of downward movement of the boom by bringing the directional control valve to an intermediate position thereby throttling the flow of liquid through a line connecting the bottom side of the boom cylinder to a liquid reservoir. When it is impossible to obtain enough speed for lowering the boom merely by bringing one directional control valve to a fully open position, two directional control valves are employed to return the liquid from the bottom side of the boom cylinder to the reservoir.

The boom of a hydraulic shovel being very heavy by itself, it has potential energy of very high magnitude when raised to a high position. However, in hydraulic drive systems of the prior art, it has been customary to control the speed of downward movement of the boom by throttling the flow of liquid through the line from the bottom side of the boom cylinder to the reservoir by actuating a directional control valve to allow the potential energy of high magnitude to be dissipated in the form of thermal energy. Thus, the hydraulic drive systems of the prior art have suffered the disadvantage that no full utilization of energy can be realized with high efficiency.

SUMMARY OF THE INVENTION

This invention has as its object the provision of a hydraulic drive system for civil engineering and construction machinery which obviates the aforesaid disadvantages of the prior art by enabling the potential energy or the energy of inertia that occurs in a movable member of the machinery to be utilized as part of the drive energy of a prime mover by recovering such energy while minimizing the loss of the energy in the form of thermal energy, to thereby permit the hydraulic drive system to realize full utilization of energy with efficiency.

According to the invention, there is provided a hydraulic drive system for civil engineering and construction machinery including, at least one hydraulic pump driven by a prime mover, at least one hydraulic actuator connected to the hydraulic pump, and at least one hydraulic cylinder, the hydraulic actuator and the hydraulic cylinder being adapted to operate a plurality of movable members. The hydraulic drive system comprises a hydraulic pump-motor driven by the prime mover, first conduit means for connecting the hydraulic pump-motor to one side of the hydraulic cylinder which moves a movable member in a direction in which the potential energy of the movable member increases in magnitude upon feeding of liquid under pressure thereinto, second conduit means for connecting the other side of the hydraulic cylinder to a reservoir, and means for controlling the hydraulic pump-motor in such a manner so that it functions as a motor only when the operator operates the system to move the movable member in a direction in which the potential energy of the movable member is reduced in magnitude.

In a preferred embodiment of the invention, the hydraulic pump-motor is a variable displacement hydraulic pump-motor, and the control means is operative to adjust the displacement of the hydraulic pump-motor in accordance with the amount of an operation performed by the operator.

In situations wherein the system further includes at least one other hydraulic pump driven by the prime mover and connected to the hydraulic cylinder through a directional control valve to operate the movable member, the control means may be operative, when the operator operates the system to move the movable member in a direction in which the potential energy thereof is reduced in magnitude, first to communicate the hydraulic pump-motor along with the hydraulic cylinder and allow the former to function as a motor, with the displacement being adjusted in accordance with the amount of an operation, performed by the operator and, second to communicate the hydraulic pump as well with the hydraulic cylinder. When the operator operates the system to move the movable member in a direction in which the potential energy thereof is increased in magnitude, first to communicate the hydraulic pump alone with the hydraulic cylinder and, second to communicate the hydraulic pump-motor as well with the hydraulic cylinder and allow the former to function as a pump, the displacement is adjusted in accordance with the amount of an operation performed by the operator.

The control means preferably comprises a regulator adapted to control the displacement and the mode of operation of the hydraulic pump-motor and includes a directional control valve, a linkage connected to the directional control valve of the regulator and the first-mentioned directional control valve for selectively actuating one of the two directional control valves in accordance with the operation of an operation lever, and an ON-OFF valve connected to the second conduit means for selectively opening and closing the conduit means in accordance with operation of the linkage.

DESCRIPTION OF THE PREFERRED EMBODIMENT

Figure 1:
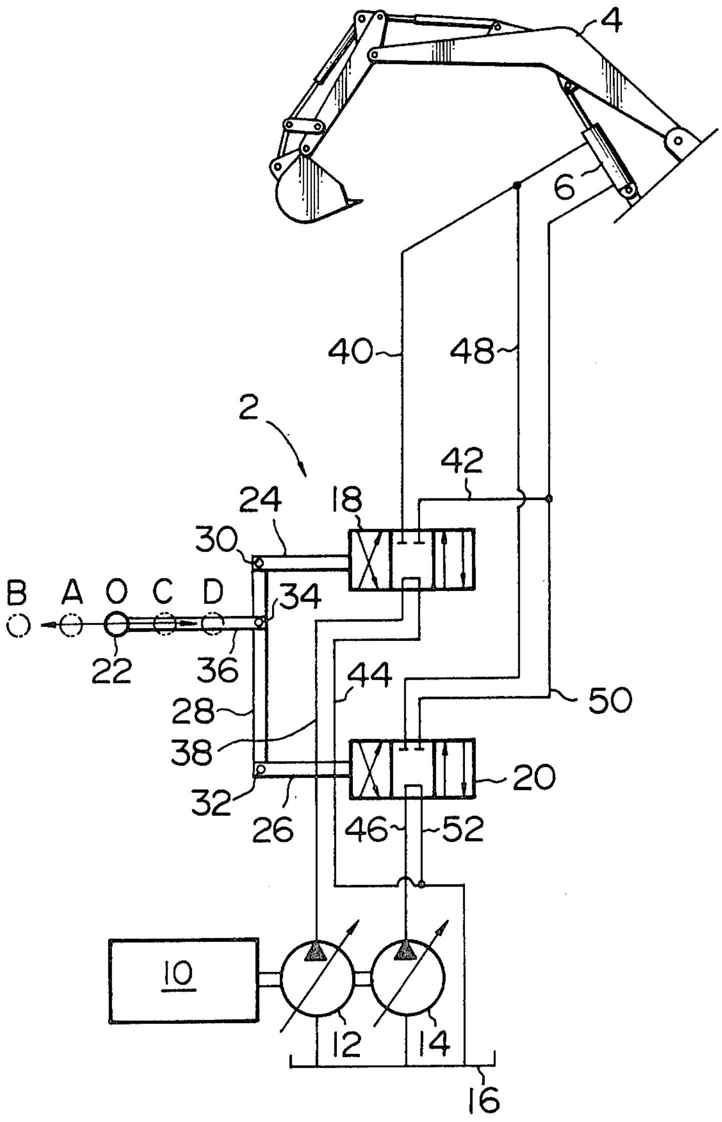
FIG. 1 PRIOR ART
FIG. 1 is a circuit diagram of a hydraulic drive system of the prior art for civil engineering and construction machinery.

As shown in FIG. 1, a prior art hydraulic system generally designated by the reference numeral 2 for a hydraulic shovel is operative to drive a cylinder 6 for actuating a movable member or boom 4 of the hydraulic shovel.

The hydraulic drive system 2 comprises a prime mover or an engine 10 having coupled thereto hydraulic pumps 12 and 14 connected to a reservoir 16 and also to the boom cylinder 6 through directional control valves 18 and 20, respectively, which can be actuated by an operation lever 22. Links 24 and 26 are connected at respective first ends thereof to the directional control valves 18 and 20, respectively, and at respective second ends thereof to opposite ends of a link 28 through pins 30 and 32, respectively. The link 28 is connected through a pin 34 at a point nearer to the directional control valve 18 than to the directional control valve 20 to a link 36 which engages the operation lever 22. The operation lever 22 is adapted to be set at positions designated O, A, B, C, with the positions A and B being positions in which the boom 4 is lowered and the position C and D being positions in which the boom 4 is raised.

In the hydraulic drive system 2, when it is desired to lower the boom 4, the operator shifts the operation lever 22 from position O toward position A. With the position of the pin 34 connecting the link 36 connected to the operation lever 22 to the link 28 being inclined toward the link 24 a suitable amount, shifting of the operation lever 22 to position A first moves the link 24 and causes the directional control valve 18 to begin to move to a right open position, so that the liquid delivered by the hydraulic pump 12 driven by the prime mover 10 flows through lines 38 and 40 to the rod side of the boom cylinder 6. Meanwhile the liquid on the bottom side of the boom cylinder 6 returns through lines 42 and 44 to the reservoir 16. At this time, if the speed at which the boom 4 is lowered is too high, the operation lever 22 may be shifted to a position intermediate the positions O and A to bring the directional control valve 18 to an intermediate position, so as to thereby control the speed of downward movement of the boom 4 by throttling the flow of fluid returning to the reservoir 16.

When it is desired to increase the speed of downward movement of the boom 4, the operator shifts the operation lever 22 to position B from position A. This causes the link 26 to move the directional control valve 20 to a right open position, so that the liquid delivered by the hydraulic pump 14 flows through lines 46 and 48 and joins the liquid flowing through the line 40 before flowing to the rod side of the boom cylinder 6. Meanwhile the liquid on the bottom side of the boom cylinder 6 returns to the reservoir 16, with part thereof flowing through the line 42, directional control valve 18 in the right open position and line 44 while the other part thereof flowing through a line 50, directional control valve 20 in the right open position and a line 52. At this time, the speed of downward movement of the boom 4 is controlled by the operator who shifts the operation lever 22 to an intermediate position between positions A and B to bring the directional control valve 20 to an intermediate position.

When it is desired to raise the boom 4, the end can be attained by performing an operation similar to the operation set forth hereinabove.

As described hereinabove, the boom 4 of a hydraulic shovel is very heavy by itself and has potential energy of high magnitude when it is located in an elevated position. In the hydraulic drive system 2, the speed of downward movement of the boom 4 is controlled by throttling the flow of liquid on the bottom side of the boom cylinder 6 by means of the directional control valve 18 to permit the potential energy of high magnitude occurring in the boom 4 to be dissipated as thermal energy. Thus the energy is wasted and the hydraulic drive system 2 has a low efficiency of energy utilization.

Figure 2:
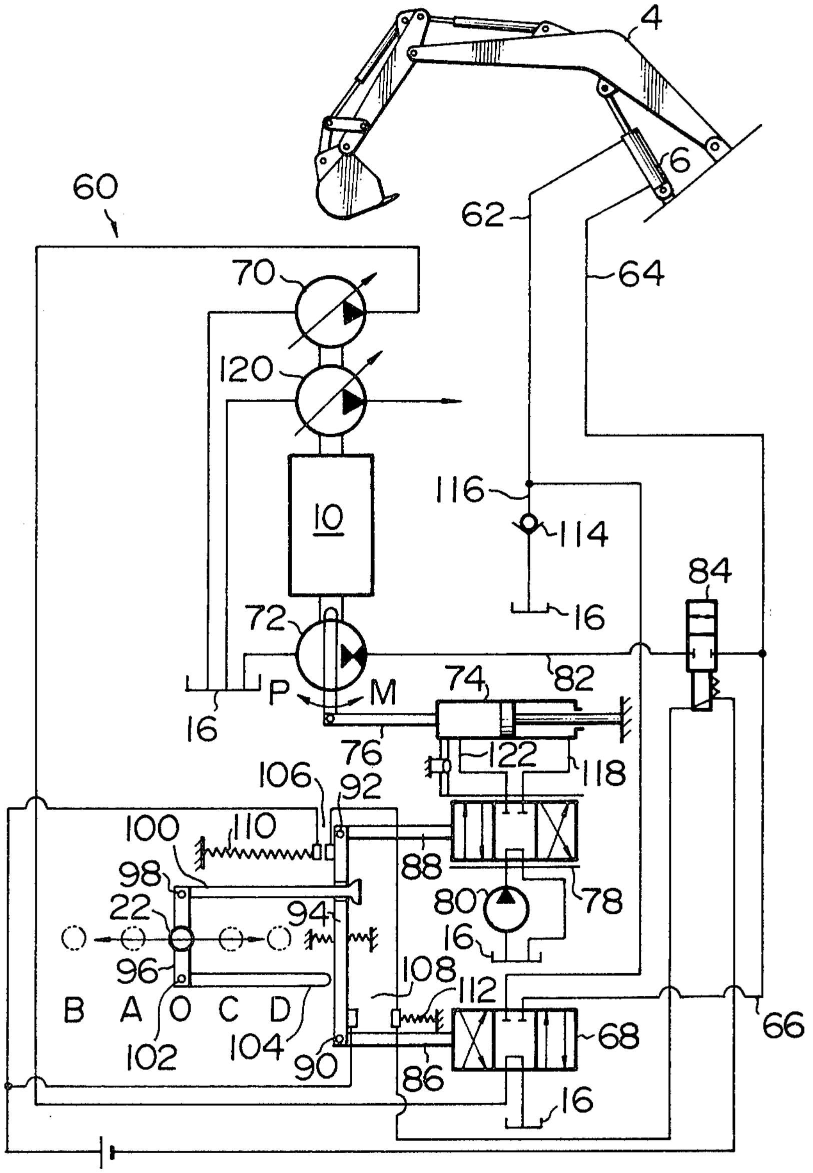
FIG. 2 is a circuit diagram of the hydraulic drive system for civil engineering and construction machinery comprising one embodiment of the invention.

Referring now to FIG. 2, wherein like reference numerals are used to designate like parts, a drive system for civil engineering and construction machinery constructed in accordance with the present invention includes a hydraulic drive system generally designated by the reference numeral 60, with the rod side and the bottom side of the boom cylinder 6 being connected, through a directional control valve 68 mounted in lines 62, 64 and 66, to a hydraulic pump 70 driven by the prime mover 10 and to the reservoir 16. A hydraulic pump-motor 72 of the variable displacement type is coupled to the prime mover 10 and is tiltable in opposite directions. The displacement or delivery per revolution of the hydraulic pump-motor 72 can be varied by a rod 76 connected to a cylinder 74 which is unitary with a directional control valve 78 and constitutes a regulator of the servo-cylinder type. The directional control valve 78 is connected to a hydraulic pump 80 and the reservoir 16. The hydraulic pump-motor 72 is connected to the line 64 on the bottom side of the boom cylinder 6 through a line 82 and an electromagnetic ON-OFF valve 84.

The directional control valves 68 and 78 have connected thereto links 86 and 88 serving as switch levers which are connected to a link 94 by pins 90 and 92, respectively. The link 94 is adapted to engage, at a point nearer to the link 88 than to the link 86, a link 100 connected by a pin 98 to one end of a link 96 unitary with the operation lever 22. Thus, the link 94 engages the link 100 and is moved thereby only when the operation lever 22 shifts in the direction AB. The link 94 is also adapted to engage, at a point nearer to the link 86 than to the link 88, a link 104 connected to the other end of the link 96 by a pin 102. Thus, the link 94 engages the link 104 and is moved thereby only when the operation lever 22 shifts in the direction CD. Moreover, the link 94 has attached thereto one contact of each of switches 106 and 108 for turning on and off the ON-OFF switch 84 as the link 94 moves. Springs 110 and 112 each yieldably support the other contact of one of the switches 106 and 108.

The line 62 connected to the rod side of the boom cylinder 6 is connected to a line 116 mounting a check valve 114 which is connected to the reservoir 16.

Operation of the hydraulic drive system 60 shown in FIG. 2 will be described. As the operation lever 22 is actuated by the operator and shifts from position O to position A, the link 100 moves and causes the link 94 to move to close the switch 106. This moves the ON-OFF valve 84 to an open position, and the directional control valve 78 only begins to be moved by the link 88 to a right position because the link 100 pulls the link 94 at a point nearer to the link 88 than to the link 86. Movement of the directional control valve 78 causes the liquid delivered by the hydraulic pump 80 to pass through a line 118 to the right side of the cylinder 74, thereby moving the rod 76 rightwardly (toward M) to allow the hydraulic pump-motor 72 to function as a motor. The liquid released from the bottom side of the boom cylinder 6 passes through the electromagnetic ON-OFF valve 84 and line 82 to the hydraulic pump-motor 72 to cause the latter to operate as a motor. Stated differently, the prime mover 10 is driven by the hydraulic pump-motor 72 serving as a motor. At this time, if another hydraulic pump 120 for driving another actuator is inoperative, the potential energy occurring in the boom 4 located in an elevated position is utilized to compensate for the mechanical loss suffered by the prime mover 10 and hydraulic pumps 70 and 120, so that the fuel consumption by the prime mover 10 is reduced. If the hydraulic pump 120 is operative, then the potential energy occurring in the boom 4 is used not only to compensate for the mechanical loss suffered by the prime mover 10 and hydraulic pumps 70 and 120, but also to give part of power to drive the pump 120, so that the fuel consumption by the prime mover 10 is reduced. In this way, it is possible to recover and utilize energy that has previously been wasted as thermal energy when the boom 4 is lowered.

At this time, liquid flows from the reservoir 16 to the rod side of the boom cylinder 6 through the check valve 114 and lines 116 and 62. Since the cylinder 74 and directional control valve 78 constitute a servo-cylinder, the distance covered by the movement of the rod 76 is determined by the amount of operation of the operation lever 22. Hence the displacement or delivery per revolution of the hydraulic pump-motor 72 is determined by the amount of operation of the operation lever 22, and a pressure commensuarate with the displacement is produced in the lines 64 and 82 and controls the speed of downward movement of the boom 4.

When it is desired to increase the speed of downward movement of the boom 4, the operation lever 22 is operated by the operator and further shifts from position A toward position B. This causes the directional control valve 68 as well to begin to move to a right position. The liquid on the bottom side of the boom cylinder 6 flows through the directional control valve 68 in the right position to the reservoir 16, to allow the boom 4 to move downwardly at high speed. The speed of downward movement of the boom 4 can be controlled by shifting the operation lever 22 to a suitable position between positions A and B so as to suitably throttle the flow of liquid from the bottom side of the boom cylinder 6 through the line 66 to the reservoir 16 by means of the directional control valve 68. It will be noted that at this time, part of the liquid in the line 64 flows through the line 82 to the hydraulic pump-motor 72 serving as a motor to drive same.

From the foregoing, it will be appreciated that it is possible to control the speed of downward movement of the boom 4 in accordance with the amount of shifting of the operation lever 22 as is the case with the system of the prior art while driving the prime mover 10 by the potential energy of the boom 4 when the operation lever 22 is in a position between positions O and A and while driving the prime mover 10 by the potential energy of the boom 4 and throttling the flow of liquid by means of the directional control valve 68 when the operation valve 22 is in a position between positions A and B.

Upon shifting of the operation lever 22 from position O toward position C to raise the boom 4, as the operator actuates the operation valve 22, the switch 106 opens and the electromagnetic ON-OFF valve 84 is closed. Since the point at which the link 104 pushes the link 94 is nearer to the link 86 than to the link 88, the movement of the link 104 first causes only the directional control valve 68 to begin to move to a left position. The liquid released from the hydraulic pump 70 flows through the directional control valve 68 in the left position and lines 66 and 74 to the bottom side of the boom cylinder 6, to raise the boom 4. At this time, the speed of upward movement of the boom 4 can be controlled by shifting the operation lever 22 to a suitable position between positions O and C to adjust the volume of liquid supplied from the hydraulic pump 70 to the bottom side of the boom cylinder 6 by means of the directional control valve 68.

When it is desired to increase the speed of upward movement of the boom 4, the operation lever 22 is caused to shift from position C toward position D by the operator. This closes the switch 112 and moves the electromagnetic ON-OFF valve 84 to an open position while causing the directional control valve 78 as well to begin to move to a left position through the links 94 and 88. The liquid delivered from the hydraulic pump 80 passes through a line 122 into the left side of the cylinder 74. This moves the rod 76 leftwardly (toward P) and allows the hydraulic pump-motor 72 to act as a pump, to thereby raise the boom 4 at increased speed.

At this time, the distance covered by the movement of the rod 76 is determined by the amount of operation of the operation lever 22, and hence the displacement or delivery per revolution of the pump is determined by the amount of operation of the operation lever 22, thereby allowing the speed of upward movement of the boom 4 to be controlled. As described hereinabove, the boom 4 can be raised by means of the hydraulic pump 70 when the operation lever 22 is in a position between positions O and C and by means of the hydraulic pump 70 and the hydraulic pump-motor 72 coupled to the prime mover 10 when the operation lever 22 is in a position between positions C and D, and it is possible to control the speed of upward movement of the boom 4 in accordance with the amount of displacement of the operation lever 22 as is the case with the prior art system. Also, it is possible to make effective use of the power of the hydraulic pump 70 driven by the prime mover 10 at all times by raising the boom 4 first by means of the hydraulic pump 70 and then by means of the hydraulic pump-motor 72.

From the foregoing description, it will be appreciated that the hydraulic drive system 60 according to the invention offers advantages that the system of the prior art has been unable to offer. First, the hydraulic drive system 60 enables a hydraulic shovel to operate with conserved energy because the potential energy occurring in a boom that has previously been wasted as thermal energy by a directional control valve when the boom 4 is moved downwardly can be utilized for driving a prime mover, compensating for the mechanical loss suffered by the prime mover 10 itself and hydraulic pumps, and driving the other actuator.

Second, in the hydraulic drive system 60, control of the speed at which the boom 4 is moved upwardly or downwardly can be effected in the same manner as in the corresponding hydraulic drive system 2 of the prior art, because actuation of the directional control valve for the hydraulic pumps, actuation of the directional control valve serving as a servo-cylinder for a hydraulic pump-motor and actuation of an electromagnetic ON-OFF valve can be effected by means of an operation lever 22 used in the hydraulic drive system 2 of the prior art. Thus, raising and lowering of the boom 4 can be carried out in the same pattern of operation as in the prior art and no special training of the operator is required.

While the invention has been shown and described by referring to its application in the recovery of potential energy occurring in the boom 4 of a hydraulic shovel, it is to be understood that the invention is not limited to this application and that the invention can achieve the same effect in recovering and utilizing the potential energy or the energy of inertia of any other movable member of civil engineering and construction machinery driven by a hydraulic cylinder.

As described hereinabove, the invention enables the potential energy or the energy of inertia occurring in a movable member of a hydraulic shovel, hydraulic crane or other civil engineering and construction machinery to be utilized to compensate for the mechanical loss suffered by the prime mover and hydraulic pumps and to be recovered for providing part of power for driving other actuator. Thus, the invention has high industrial importance because it enables conservation of energy to be achieved by reducing fuel consumption by the prime mover.

What is claimed is:

1. A hydraulic drive system for civil engineering and construction machinery including at least one hydraulic pump driven by a prime mover, at least one hydraulic actuator connected to the hydraulic pump, at least one hydraulic cylinder, the hydraulic actuator and the hydraulic cylinder being adapted to operate a plurality of movable members, and at least one other hydraulic pump driven by the prime mover and connected to the hydraulic cylinder through a directional control valve to operate an associated movable member, characterized in that the hydraulic drive system comprises:
- a hydraulic pump-motor driven by the primer mover;
- first conduit means for connecting the hydraulic pump-motor to one side of the hydraulic cylinder which moves a movable member in a direction in which a potential energy of the movable member increases in magnitude upon feeding of a pressure medium under pressure thereinto;
- second conduit means for connecting a second side of the hydraulic cylinder to a reservoir; and
- means for controlling the hydraulic pump-motor in such a manner that it functions as a motor driven by the hydraulic cylinder only when the operator operates the hydraulic drive system to move the movable member in a direction in which the potential energy thereof is reduced in magnitude, whereby the potential energy of the movable member is utilized to drive the prime mover and thus said hydraulic pumps, through said hydraulic pump-motor functioning as a motor.

2. A hydraulic drive system as claimed in claim 1, characterized in that said hydraulic pump-motor is a variable displacement hydraulic pump-motor, and that the controlling means is operative to adjust the displacement of the hydraulic pump-motor in accordance with the amount of an operation performed by the operator.

3. A hydraulic drive system for civil engineering and construction machinery including at least one hydraulic pump driven by a prime mover, at least one hydraulic actuator connected to the hydraulic pump, at least one hydraulic cylinder, the hydraulic actuator and the hydraulic cylinder being adapted to operate a plurality of movable members, and at least one other hydraulic pump driven by the prime mover and connected to the hydraulic cylinder through a directional control valuve to operate an associated movable member, characterized in that the hydraulic drive system comprises:
- a hydraulic pump-motor driven by the prime mover, the hydraulic pump-motor is a variable displacement hydraulic pump-motor;
- first conduit means for connecting the hydraulic pump-motor to one side of the hydraulic cylinder which moves a movable member in a direction in which a potential energy of the movable member increase in magnitude upon feeding of pressure medium under pressure thereinto;
- second conduit means for connecting a second side of the hydraulic cylinder to a reservoir; and
- means for controlling the hydraulic pump motor in such a manner that it is operative, when the operator operates the hydraulic drive system to move the movable member in a direction in which the potential energy thereof is reduced in magnitude, first to communicate the hydraulic pump motor alone with the hydraulic cylinder and to allow the former to function as a motor with a displacement being adjusted in accordance with an amount of operation performed by the operator and second, to communicate the hydraulic pump as well with the hydraulic cylinder, and when the operator operates the system to move the movable member in a direction in which the potential thereof is increased in magnitude, first to communicate the hydraulic pump alone with the hydraulic cylinder, and second, to communicate the hydraulic pump motor as well with the hydraulic cylinder and to allow the former to function as a pump with a displacement being adjusted in accordance with an amount of operation performed by the operator.

4. A hydraulic drive system as claimed in claim 3, characterized in that the controlling means includes a regulator adapted to control the displacement and the mode of operation of the hydraulic pump-motor and including a directional control valve, a linkage connected to the directional control valve of the regulator and the first-mentioned directional control valve for selectively actuating one of the two directional control valves in accordance with the operation of an operation lever, and an ON-OFF valve connected to the second conduit means for selectively opening and closing the conduit means in accordance with operation of the linkage.

5. A hydraulic drive system as claimed in claim 1, characterized in that the controlling means includes an ON-OFF valve connected in the second conduit means for selectively opening and closing the second conduit means in accordance with operation by the operator.

* * * * *